United States Patent
Frey

(10) Patent No.: US 6,896,812 B1
(45) Date of Patent: May 24, 2005

(54) PROCESS TO COMPENSATE FOR A DISCRETE NON-SEPARATING SECTION IN SIMULATED MOVING BED ADSORPTIVE SEPARATION PROCESSES

(75) Inventor: Stanley J. Frey, Palatine, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 10/621,622

(22) Filed: Jul. 17, 2003

(51) Int. Cl.⁷ .............................................. B01D 15/08
(52) U.S. Cl. ..................................... 210/659; 210/198.2
(58) Field of Search ............................... 210/635, 656, 210/659, 198.2, 662; 127/46.1, 46.2

(56) References Cited

U.S. PATENT DOCUMENTS

| | | | |
|---|---|---|---|
| 4,990,259 A | * 2/1991 | Kearney et al. | 210/659 |
| 5,102,553 A | 4/1992 | Kearney et al. | 210/659 |
| 5,578,215 A | 11/1996 | Hotier et al. | 210/659 |
| 5,578,216 A | 11/1996 | Hotier et al. | 210/659 |
| 5,582,736 A | 12/1996 | Hotier et al. | 210/659 |
| 5,667,693 A | * 9/1997 | Hester et al. | 210/635 |
| 5,902,486 A | * 5/1999 | Couenne et al. | 210/659 |
| 6,063,285 A | 5/2000 | Hotier et al. | 210/659 |
| 6,375,839 B1 | * 4/2002 | Adam et al. | 210/198.2 |

* cited by examiner

Primary Examiner—Ernest G. Therkorn
(74) Attorney, Agent, or Firm—John G. Tolomei; James C. Paschal; David J. Piasecki

(57) ABSTRACT

Fluctuations, such as perturbations in the quality of the extract and/or raffinate streams removed from the circuit in a simulated moving bed (SMB) adsorptive process having at least one discrete non-separating section are eliminated or significantly reduced. This is accomplished by increasing the fluid flow rate in a portion of the circuit in response to the location of a discrete non-separating section and changing the flow rate of at least one stream that is in fluid communication with the circuit consistent with the increased flow rate in the portion of the circuit. Multiple adjustments to the flow rates of the input and/or output streams and multiple increases in the fluid flow rates in portions of the circuit may be used simultaneously when for example there is more than one discrete non-separating section.

20 Claims, No Drawings

PROCESS TO COMPENSATE FOR A DISCRETE NON-SEPARATING SECTION IN SIMULATED MOVING BED ADSORPTIVE SEPARATION PROCESSES

FIELD OF THE INVENTION

The subject invention relates to a process for the adsorptive separation of a component from a mixture of components. More specifically, the invention relates to a method to improve operating economics in a simulated moving bed (SMB) adsorptive separation process having a discrete non-separating section. An exemplary application of the invention is the separation of aromatic hydrocarbons such as the separation of para-xylene from a mixture of $C_8$ aromatic hydrocarbons in a countercurrent SMB process.

BACKGROUND OF THE INVENTION

Many processes are known for separating components from a fluid mixture. Chromatography makes use of a wide range of adsorbents having varying degrees of affinity for different components of a fluid mixture, thereby causing the components to separate as they flow through the adsorbent. Similarly, materials known as molecular sieves may affect the rates at which components of a fluid mixture pass through them by admitting only molecules of certain components into the pore structure of the material, but not of other components. Some adsorbents are also believed to provide separation by differences in the electrochemical attraction of the components. Thus, the component for which the adsorbent has the greater affinity or retention capacity may be recovered or desorbed by means of a desorbent material.

Processes for separating components from a fluid mixture based on the use of adsorbents for chromatographic type separations include simulated moving bed (SMB) systems. The flexibility of SMB technology is well established as many combinations of adsorbents, desorbents, equipment configurations, and process conditions are well known for a wide variety of industrial applications. Examples of such processes are: the separation of linear paraffins from branched-chain and cyclic hydrocarbons, olefins from paraffins, para-cresol or meta-cresol from cresol isomers, para-cymene from cymene isomers, 1-butene from a mixture of paraffins and olefins which contain four carbon atoms, fructose and glucose from mixtures thereof, ethylbenzene from xylene isomers, cyclic hydrocarbons and olefins from paraffins, isomers of $C_8$ aromatic hydrocarbons from mixtures thereof, chiral compounds for use in pharmaceuticals and fine chemicals, oxygenates such as alcohols and ethers, and the gas phase separation of propylene from propane.

It is also known that the composition of the extract and raffinate streams withdrawn from a SMB adsorptive separation circuit fluctuate when the non-selective volume is unevenly distributed in the circuit. The term "discrete non-separating section" herein refers to any portion of non-selective volume that is non-uniformly distributed in the circuit. This term is discussed and defined in more detail later herein. A common example is the conduit and associated equipment that connects the two ends of a column containing the adsorbent where all the adsorbent is loaded in a single column.

U.S. Pat. No. 5,582,736 is directed to a SMB adsorptive separation process characterized in that each time an extract or raffinate stream passes from a position immediately anterior to a position immediately posterior to each of the dead volumes in the circuit, the flow rate regulated by the recycling pump is increased during the time when the extract or raffinate remains in the position immediately posterior to a dead volume and then reducing the flow rate to the value which would have been applied if the dead volume had been ignored when the extract or raffinate passes from the position immediately posterior to the dead volume to the following position.

U.S. Pat. No. 5,578,215 is directed to a SMB adsorptive separation process having independent shifting of the injection and extraction circuits. The process is characterized in that the time an injection or extraction stream is connected to the circuit is increased each time the stream moves from a position immediately anterior to a position immediately posterior to each dead volume or degraded section and then reducing the connection period to the value which would have been applied if the dead volume or degradation had not occurred when the injection and extraction stream passes from the immediately posterior position to the following position.

U.S. Pat. No. 5,578,216 is directed to a SMB adsorptive separation process having a dead volume in the circuit. The process is characterized in that the volume of the section immediately upstream of the dead volume is reduced by an appropriate value when the dead volume is located downstream of this section and upstream of the extraction streams of the section, or the volume of the section immediately downstream of the dead volume is reduced by an appropriate value when the dead volume is located downstream of the injection streams into the section and upstream of this section.

U.S. Pat. No. 6,063,285 is directed to regulating the flow rate of at least one fluid in a SMB adsorptive separation process through the use of at least one restriction means in addition to the control valve in the pressure controlled withdrawal line enabling the pressure downstream of at least one of the beds to be reduced.

U.S. Pat. No. 5,102,553 is directed to controlling flow rates through individual compartments in a SMB adsorptive separation process in accordance with time variable functions in each step.

BRIEF SUMMARY OF THE INVENTION

The present invention moves beyond the current practice and provides a more useful SMB process where there is at least one discrete non-separating section in the circuit. Specifically, the present invention involves increasing the fluid flow rate in a portion of the circuit in response to the location of a discrete non-separating section and changing the flow rate of at least one stream that is in fluid communication with the circuit consistent with the increased flow rate in the portion of the circuit. In another embodiment, the invention involves changing the flow rates of at least two of the fluid streams entering and/or leaving the SMB circuit or adsorption chamber and increasing the fluid flow rate in at least a portion of a zone, the zone encompassing a discrete non-separating section. Multiple adjustments to the flow rates of the input and/or output streams and multiple increases in the fluid flow rates in portions of the circuit may be used simultaneously when for example there is more than one discrete non-separating section.

The invention finds use in minimizing or eliminating perturbations in the quality of the extract and/or raffinate streams removed from the circuit or adsorption chamber. The specific separation being performed will influence the actual manner in which the economic benefit is obtained.

Examples include increasing the product purity and/or recovery. It may also be used to process more feed per quantity of adsorbent, and/or reduce the quantity of desorbent required. These and other objects and embodiments will become clearer after a detailed description of the invention.

DETAILED DESCRIPTION OF THE INVENTION

A wide variety of simulated moving bed (SMB) adsorptive separations are performed using established commercial technology wherein a circulating fluid (mobile phase) is maintained flowing through an adsorbent. This is typically performed for example through use of a pump operatively connected to the circuit in a manner to achieve fluid circulation along the entire length of the adsorbent when the fluid is a liquid. Likewise, a compressor may be used when the fluid is a gas. The adsorbent (stationary phase) is retained in one or more vessels which are typically cylindrical and vertically oriented. The ends of vessels are operatively connected to create a single continuous loop or circuit. The term "chamber crossover line" is used herein to refer to the conduit(s) used to connect the vessel ends and any associated equipment, for example pump(s), flow meter(s), and control valve(s). The term "adsorption chamber" is herein used to collectively refer to all equipment that defines the circuit including for example all vessels containing adsorbent, the chamber crossover lines, and other equipment through which the fluid circulation is maintained. The adsorbent is normally held in place in a plurality of beds, typically 4–24, which are usually structurally separated from one another by fluid collection/distribution grids. These grids may be similar to the apparatus described in U.S. Pat. Nos. 3,208,833; 3,214,247; and 3,523,762. These distributor-collectors serve to aid in the establishment and maintenance of plug flow of the fluids along the length of the adsorbent. Each grid is normally connected to a transfer line defining a transfer point at which fluid streams enter or leave the circuit. The use of multiple transfer lines such as a dedicated transfer line for each fluid process stream at each grid or transfer point is also known.

Movement of the adsorbent is simulated by the periodic, actual movement of the location of the various input and output fluid streams along the circuit. There are at least two streams which add fluid to the circuit and at least two streams which remove fluid from the circuit. Normally, two of the input fluid streams are referred to as a feed stream and a desorbent stream, and two of the output fluid streams are referred to as an extract stream, and a raffinate stream. These four streams are herein referred to as "primary" fluid streams. The term "feed stream" indicates a fluid stream of a feed mixture which passes to the adsorbent in the circuit. A "feed mixture" is a mixture containing one or more extract components and one or more raffinate components to be separated by the process. The term "desorbent stream" indicates the stream through which desorbent passes to the adsorbent. The term "desorbent" shall mean one or more compounds capable of desorbing an extract component from the adsorbent. Relative to each other, an "extract component" is a compound or group of compounds that is more selectively adsorbed by the adsorbent and a "raffinate component" is a compound or group of compounds that is less selectively adsorbed. The term "raffinate stream" means a stream through which a raffinate component is removed from the adsorption chamber or circuit. The composition of the raffinate stream can vary from essentially 100% desorbent to essentially 100% raffinate components. The term "extract stream" shall mean a stream through which an extract component which has been desorbed from the adsorbent by a desorbent is removed from the circuit. The composition of the extract stream, likewise, can vary from essentially 100% desorbent to essentially 100% extract components.

The locations at which the feed and desorbent streams enter the circuit or adsorption chamber and the extract and raffinate streams leave the circuit are usually simultaneously shifted in the same direction at set intervals. Independent shifting of the locations of the input and output fluid streams is also known in the art. This shifting may simulate either cocurrent or countercurrent movement of the adsorbent with respect to the circulating fluid. Thus, as the operational cycle progresses, the transfer points through which the fluid streams enter and leave the circuit are periodically shifted along the length of the adsorbent so that the streams enter or leave different adsorbent beds. Each incremental shift in the location of these transfer points delivers and removes fluid from a different portion of the adsorbent within the circuit or adsorption chamber. It is noted that there is no requirement for the adsorbent to be physically divided into separate beds. The adsorbent may be a continuous mass in the circuit with the location of the transfer points defining the location of each "bed" of adsorbent. The cyclic advancement of the various input and output streams along the circuit through the respective transfer points may be achieved, for example, by a multiple-valve manifold such as shown in U.S. Pat. No. 4,434,051 or by the use of a multiple-port rotary valve such as shown in U.S. Pat. Nos. 3,040,777 and 3,422,848. A central digital controller is preferably used to regulate the operation of the rotary valve or manifold.

It has become customary in the art to describe the simulated moving bed (SMB) adsorptive separation process in terms of zones. SMB processes typically include at least four separate steps or functions which are performed simultaneously in separate zones. A zone being defined as the portion of the circuit between a pair of sequentially located primary fluid streams. Thus, each zone will have at least one operating parameter which distinguishes it from the other zones to obtain the desired function according to the specifics of the desired separation. For example, in many SMB processes the zones are considered to be at essentially the same temperature and pressure despite minor variations. This is not a requirement of the invention and either or both temperature and pressure may be sufficiently varied to distinguish the zones. Often, the zones are distinguished from each other by differences at least in the fluid flow rate through and the quantity of adsorbent in each zone. However, the subject invention does not require either or both of these parameters be used to distinguish the zones. It is stressed that although zones have a variety of operating parameters, the specific parameters used in the various zones of a particular SMB process are not known to limit the subject invention. Thus, the zones actually move through the adsorption chamber or circuit by the periodic advancement of the four primary fluid streams through the sequence of transfer points along the circuit. It is only the locations of the zones as defined by the respective entry and withdrawal points along the circuit which change. The adsorbent bed itself is fixed and does not move.

The general technique employed in the performance of a simulated moving bed (SMB) adsorptive separation is well described in the literature. For instance, a general description directed to the recovery of para-xylene is presented at page 70 of the September 1970 edition of *Chemical Engineering Progress* (Vol. 66, No 9). A generalized description of the process with an emphasis on mathematical modeling was presented at the International Conference on "Fundamentals of Adsorption", Schloss Elmau, Upper Bavaria, Germany on May 6–11, 1983 by D. B. Broughton and S. A. Gembicki. The simulated moving bed technique is also described in R. A. Meyers, *Handbook of Petroleum Refining Processes*, pages 8–85 to 8–87, McGraw-Hill Book Company (1986) and in the Adsorptive Separation section of the *Kirk-Othmer Encyclopedia of Chemical Technology*. Numerous other available references describe many of the mechanical parts of a simulated moving bed system, including rotary valves for distributing various liquid flows, the internals of the adsorbent chambers and control systems. The subject invention may be readily understood with reference to a countercurrent SMB process. However, such discussion with respect to one or more embodiments is not intended to limit in any way the scope of the claimed invention.

In a first type of SMB adsorptive separation process, the adsorbent is held in a single vertical vessel. A chamber crossover line including a conduit and a pump connects the bottom of the vessel to the top of the vessel to maintain circulation of the fluid generally downward through the adsorbent. The feed, desorbent, raffinate, and extract streams are incrementally moved through the transfer points down the column to simulate the upwards movement of the adsorbent countercurrent to the liquid flowing down the vessel. As the various zones move through the circuit, the pump is adjusted to match the flow rate required within the zone that contains the chamber crossover line. The terms "upstream" and "downstream" are used herein in their normal sense and are interpreted based upon the overall direction in which liquid is flowing in the vessel. Thus in this example, upstream is equivalent to an upward or higher location in the vessel and downstream is equivalent to a downward or lower location in the vessel. Since liquid is flowing "downward" from the bottom of the vessel to the top, the top of the vessel is immediately downstream of the bottom of the vessel. The time between each incremental shift in the location of the feed stream is the "step time" of the process. The time required for the location of the feed point, to completely move through all of the transfer points is the "cycle time" of the process.

The feed stream enters the vessel at an upstream boundary of an adsorption zone wherein it flows downward and is contacted with a selective adsorbent having a greater affinity for an extract component relative to a raffinate component. Thus, the ratio of raffinate component(s) to extract component(s) in the liquid flowing in the adsorption zone generally increases along the length of the adsorption zone. A portion of this liquid which is relatively depleted of an extract component and any desorbent which becomes admixed with it during passage through the adsorption zone is withdrawn from the circuit as the raffinate stream at a downstream boundary of the adsorption zone.

A desorbent stream enters the circuit at an upstream boundary of a desorption zone. In the desorption zone, an extract component retained by the adsorbent during the adsorption step is released from the adsorbent by exposing and flushing the adsorbent with the desorbent. A portion of the released or desorbed extract component and accompanying desorbent are removed from the circuit as the extract stream at a downstream boundary of the desorption zone. The adsorbent in the adsorption zone is surrounded by liquid which contains a raffinate component. Therefore, this liquid should be removed from the adsorbent before the desorption step to prevent or minimize contamination of the extract stream with a raffinate component. This is accomplished in a purification zone where the location of the extract stream defines an upstream boundary of the purification zone and the location of the feed stream defines a downstream boundary of the purification zone. Thus, some of the liquid leaving the desorption zone exits the circuit as the extract stream while the remainder flows down through the purification zone to flush the raffinate component from the adsorbent, which by virtue of the movement of the zones, appears to be ascending in the vessel.

A buffer zone is frequently operated downstream of the adsorption zone and upstream of the desorption zone. Thus, the raffinate stream location defines an upstream boundary of the buffer zone. A downstream boundary of the buffer zone is defined by the location of the desorbent stream. The purpose of this buffer zone is to prevent a raffinate component which leaves the adsorption zone from entering the desorption zone where they would again contaminate the extract stern. This is typically accomplished by setting the liquid flow rate in the buffer zone to be less than the rate at which the buffer zone descends the vessel. Thus, although there is a real net flow of liquid down the buffer zone, the apparent liquid flow, relative to the simulated motion of the adsorbent, is cocurrent in this zone.

The adsorbent is a material having greater affinity or selectivity to retain one component or group of components (extract) relative to another component or group of components (raffinate) in the feed mixture. Thus, the adsorbent may be understood to define a selective volume in the circuit. This is the volume which is accessible to the fluid and which provides the desired selectivity for separation. The adsorbent is normally used in the form of particle agglomerates containing both the selective adsorbent material and a binder material which is usually not selective. The adsorbent particles may be in a variety of forms such as extrudates, tablets, spheres, or granules having a desired size range, frequently between No. 16 and No. 60 Standard U.S. Sieves, ASTM Specification E-11. For example, an adsorbent may be dispersed in a binder having channels and cavities, know as pores, which provide fluid access to the adsorbent. Thus, the agglomerates typically have both a selective volume or pore volume and a non-selective volume or pore volume. The interstitial volume located between the particles in the adsorbent beds further contributes to the non-selective volume of the circuit. Naturally, any volume of the circuit where no adsorbent is present provides only non-selective volume. Thus, the components are only transported and not separated in the non-selective volume.

In contrast to the first type of SMB process discussed above, a second type is known where each incremental shift in the location of the zones along the circuit is intended to provide constant amounts of selective and non-selective volume in each zone, though of course the total of these volumes need not be the same for every zone. An example of such a process is where each bed of adsorbent is located in a separate vessel and conduits connect each vessel to a multi valve manifold, and where all of the adsorbent beds, vessels and conduits are practically identical. Thus, at each step, every zone moves along the circuit by one vessel thereby maintaining a constant amount of selective and non-selective volume in each zone.

However, it is known that the total amount of non-selective volume in the circuit can be reduced by using multiple beds per vessel and connecting the ends of the vessel(s) to complete the circuit. Such a design often provides an overall economic advantage for example by decreasing the amount of desorbent required despite the addition of one or more chamber crossover lines. It is readily apparent that a chamber crossover line introduces a discontinuity with respect to the non-selective volume in the circuit. As the zones move through such a circuit, their non-selective volumes now vary between a standard amount when the chamber crossover line is not in the zone and an increased amount when the chamber crossover line is included in the zone. Any such discontinuity in the circuit is herein referred to as a "discrete non-separating section".

That is, if the amount of non-selective volume in a zone changes after an incremental shift in the location of the zone at any time in the cycle, a "discrete non-separating section" exists in the circuit. Examples of discrete non-separating sections include: the conduits and associated equipment for connecting each end of the vessel containing the adsorbent or the lines and associated equipment for connecting multiple vessels in series. Sampling loops connected to the circuit may also define a discrete non-separating section. Other examples include one or more beds of adsorbent that do not have the same amount of non-selective volume as every other bed because of size, location, compaction, poisoning, that is some decrease in the fiction of the selective adsorbent volume, or other causes. Thus, one or more discrete non-separating sections may unintentionally develop in or be added to the circuit for example during loading of the adsorbent, start up of the process, and/or during operations. In this way, it is readily observed that the subject invention is also applicable to SMB processes which were not designed or intended to have such a discontinuity, but nonetheless acquire a discrete non-separating section at some point in time.

The change in non-selective volume caused by the addition of a discrete non-separating section to a zone is known to cause perturbations in the process such as fluctuations in the composition of the extract and/or raffinate streams. The magnitude of these perturbations a nd the length of time they last naturally depend on the specific separation being performed and the operating parameters employed. The subject invention provides an effective process for eliminating or significantly reducing the variations caused by one or more discrete non-separating sections in a SMB process, including the perturbations in extract and/or raffinate stream compositions.

It is an objective of the subject invention to provide an improved process for the simulated moving bed adsorptive separation of chemical compounds. Various embodiments of the invention may be readily used to improve the economic benefit from a specific SMB adsorptive separation process. Therefore, the objectives of these various embodiments may differ according to the specific SMB process of interest. Examples of these objectives include: decreasing the amount of desorbent required; reducing the ratio of adsorbent to feed; increasing the recovery of a component; and increasing the purity of a component in a product stream. These and other objectives may be combined to improve a SMB process. It is a specific objective to provide an improved simulated moving bed adsorptive separation process which recovers para-xylene from a feed stream comprising a mixture of xylene isomers such as by increasing the purity of the recovered para-xylene.

It has been found that these objectives can be achieved by changing the flow rate of at least one of the fluid streams entering or leaving the circuit to compensate for a discrete non-separating section volume. The invention compensates for the increased non-selective volume when a zone includes a discrete non-separating section by increasing the volume of fluid passed through the zone or portion thereof. In some embodiments, it may be undesirable to simply increase the circulation rate throughout the entire circuit as this propagates the perturbation throughout the circuit and may cause other undesirable results such as a decreased recovery of the product of interest. Hence, it is preferable to change the flow rates of at least two of the fluid streams that enter or leave the circuit to limit the increased flow to a portion of the circuit. The flow rate of a fluid stream will increase or decrease depending on whether it is an input or output stream and if it is upstream or downstream of the portion of the circuit having the increased fluid flow rate. Although the flow rates of the fluids must be controlled, the manner by which control is maintained is not critical to the operation of the invention. There are many well known means for controlling the flow rate of fluids. Manual control may be possible, but more commonly, one or more of a wide variety of automatic control means comprising for example a sensing means, a set point means and a regulating means is employed. The flow rates may be independently controlled or the control of one or more flow rates may for example depend on others such as by cascade or ratio control. Set points may be established manually or automatically; they may be updated periodically based on measured process parameters such as stream properties. The flow rates may also be controlled indirectly such as that required in order to maintain another operating parameter such as pressure.

The equation $C=V*K$ defines a preferred volume by which the fluid flow through a portion of the circuit is to be increased. Where C is the volumetric increase in fluid flow in a portion of the circuit, V is the volume of the discrete non-separating section, and K is a coefficient. In some embodiments, the increase in fluid volume determined above may be evenly distributed over time T such that the standard flow rate is increased by an essentially constant amount, R, in a portion of the circuit where $R=C/T$ and T is the length of time the increase in flow rate is applied. The following description will make clear that the invention encompasses myriad ways in which the increased fluid volume may be distributed over time.

In one embodiment of the subject invention, the adsorbent is contained within one vessel and the chamber crossover line connecting the top and bottom of the vessel defines a discrete non-separating section. Therefore, V would include the volume of the conduit connecting the ends of the vessel, and the volume of any other associate equipment conveying the fluid between the ends of the vessel such as a pump and control valve. In some embodiments, there may be additional non-selective volume in the vessel that would also be included in V such as that associated specifically with the top and/or bottom adsorbent beds. For example additional volume, relative to another adsorbent bed, may provide space for equipment to enhance the fluid distribution to the top bed and/or fluid collection from the bottom bed. In such cases, the discrete non-separating section encompasses the chamber crossover line. That is, the chamber crossover line defines a portion of the discrete non-separating section. The volume of a chamber crossover line, including appropriate volume within the vessel, if any, is typically minimized to the extent possible within other constraints and usually represents from about 0.2 to about 2.0 percent of the total non-selective volume of the circuit. As the volume of a discrete non-separating section, V, increases with respect to the total non-selective volume of the circuit, the potential benefits derived from the invention also increase at least within a given separation process.

In those embodiments for which C is calculated, the use of the coefficient, K, recognizes that the increase in the volumetric fluid flow in a portion of the circuit need not be identical to the volume of the discrete non-separating section, V, to provide a benefit. That is, sufficient benefits may be obtained according to the invention even if the increase in volumetric fluid flow is more or less than the actual value of V. Again, details of the specific SMB process will influence the range over which K may vary and still provide an acceptable benefit. In some cases, compensation for the additional discrete non-separating section volume must be balanced against other process constraints such as flow rate limitations through various pieces of equipment. In many cases, significant benefits may be obtained where K is less than 1. K may also be used for example to tune or optimize the process such as by accounting for differences between measured or estimated and actual values of V. This can be especially useful when for example a discrete non-separating section develops during operation of the process such as through poisoning of or channeling through an adsorbent bed. In such a case, it may be desirable to continue operations and estimate the value of V. However, if the actual value of V is different than the estimated value, perturbations in the process such as fluctuations in the composition of the raffinate and/or extract stream may continue to be observed even after the flow rates are adjusted according to the invention. Similarly, K may also be used to compensate for imperfect plug flow of the fluids through the circuit. Therefore, the value of K may be adjusted while the process is operating to further minimize or eliminate these perturbations. Several adjustments to the value of K may be required to achieve the desired benefits. Relationships, empirical or otherwise, between fluctuations in raffinate and/or extract stream properties, and appropriate changes to the value of K to further reduce these fluctuations may be developed to facilitate achievement of the desired results. For example, an algorithm may be developed to change the value of K as a function of the magnitude and/or duration of changes in the concentration of one or more components in either or both of the raffinate and extract streams. Other operating parameters of the specific SMB separation may of course be included in such an algorithm. Such an algorithm may be incorporated into the control mechanism of the process. Typically, the value of K will be between about 0.05 and about 3.0. In an embodiment, K is between about 0.1 and about 2.0. In another embodiment, K is between about 0.2 and about 1.5.

Again, in certain embodiments, the length of time over which the increase in volumetric flow may be applied, T, may vary significantly based on the specific separation being performed and various operating parameters. The minimum value of T is equivalent to the minimum time required to operate the equipment such as valves to effect the change, roughly 10 seconds. The maximum value of T is equivalent to the entire time that the zone includes the discrete non-separating section. In one embodiment, T is between about 80% of the time that the zone includes the discrete non-separating section and about 50% of the time of a single step. In another embodiment, T is between about 50% of the time that the zone includes the discrete non-separating section and about the time of a single step.

One embodiment of the subject invention is used to minimize fluctuations in the composition of a raffinate stream as follows. All adsorbent is contained in one vessel with three beds of adsorbent comprising the buffer zone and a chamber crossover line including a conduit and a pump connects the bottom of the vessel to the top of the vessel to maintain circulation of the fluid generally downward through the adsorbent. Feed, desorbent, raffinate, and extract streams connected to the circuit are incrementally moved through the transfer points down the column to simulate the upwards movement of the adsorbent countercurrent to the liquid flowing down the vessel. Further, the step time of the process is 80 seconds and the volume of the single discrete non-separating section including volume within the chamber crossover line and the vessel, V, is 5 liters. The standard flow rates, of interest are: 29 l/min in the buffer zone, with a desorbent addition rate to the circuit of 15.9 l/min and a raffinate withdrawal rate from the circuit of 19.9 l/min. These standard rates are those determined without correcting for the discrete non-separating section as taught herein. These standard flow rates are often, except for minor variations such as to control the pressure of the process, held essentially constant. If no compensation is made for the discrete non-separating section in other zones, these standard values are applied at least for the time that the buffer zone does not include the chamber crossover line.

For one step per cycle, the desorbent stream is delivered to the top of (upstream) the lowest bed in the vessel and the raffinate stream is withdrawn from the circuit at a higher location than the desorbent stream and spaced apart by three adsorbent beds. During this time, arbitrarily step 0, the discrete non-separating section is included in the desorption zone which is located between the desorbent and extract streams. When the locations of the fluid streams shift at the next increment, the desorbent stream may shift to one of two positions depending on the design of the unit. In a first case, the desorbent stream shifts to a transfer point between the lowest bed and the bottom of the vessel and remains there during step 1. Thus in this first case, the discrete non-separating section remains in the desorption zone and it does not enter the buffer zone until after the next increment, when the desorbent stream occupies a transfer point between the highest and second highest beds in the column (step 2). In a second case, the desorbent stream shifts to occupy a transfer point between the top of the vessel and the top of the highest bed in the column during step 1 so that the buffer zone includes the discrete non-separating section starting with step 1. In either case, the discrete non-separating section will be included in the buffer zone for 3 steps in each cycle. The location of the transfer points as discussed above provides one discrete non-separating section. In this embodiment, the standard non-selective volume in the buffer zone increases by 5 liters when the buffer zone moves to include the single discrete non-separating section. This higher non-selective volume is maintained constant in the buffer zone for the three steps it includes the discrete non-separating section and the buffer zone returns to its standard non-selective volume on the following increment when the adsorption zone moves to include the discrete non-separating section. Likewise, the adsorption zone non-selective volume will be 5 liters higher than its standard non-selective volume for the number of steps the adsorption zone comprises the discrete non-separating section and so on through the cycle. However, the locations of the transfer points as discussed above are not required. For example, there may be more than one discrete non-separating section even where there is a single chamber crossover line. That is, the transfer point downstream of the lowest bed in the column could occupy some point intermediate the two noted above so that the circuit would comprise two discrete non-separating sections. There is no requirement for how a discontinuous non-selective volume is divided by the location of the transfer points. In one example the transfer point downstream of the lowest bed is relatively close to the lowest bed in the column so that when the desorbent stream moves to this position in step 1 the buffer zone non-selective volume increases by 0.5 liters above its standard non-selective volume. When the desorbent stream moves to the following position downstream of the highest bed in the column in step 2 the buffer zone non-selective volume increases by an additional 4.5 liters (a total of 5 l) above its standard non-selective volume. During step 3 the non-selective volume of the buffer zone remains 5 l above its standard volume. The buffer zone non-selective volume then decreases by 0.5 liters in step 4, and finally by 4.5 liters to return to its standard non-selective volume in step 5. Examples of embodiments of the invention encompassing multiple discrete non-separating sections such as this and others are discussed later.

Returning now to this embodiment of a single discrete non-separating section, the increased volumetric flow, C, is 5 liters as determined from V=5 liters and K=1.0 and it will be limited to the buffer zone by changing the flow rates of the raffinate and desorbent streams. Further, in consideration of other process constraints, it is desired to minimize the magnitude of the change in flow rates. Therefore, this increased volume will be evenly distributed over all three steps that the buffer zone includes the discrete non-separating section (T=4 minutes). Thus, R=1.25 l/min and the flow rate in the buffer zone is increased to 30.25 l/min and the flow rates of both the raffinate and desorbent streams are decreased by the same amount, R. That is, the desorbent addition rate is 14.65 l/min and the raffinate withdrawal rate is 18.65 l/min for the same three steps. Naturally, as for every step of the process, the pump in the chamber crossover line must be controlled to match the flow rate required by the portion of the circuit that includes the pump, 30.25 l/min in this embodiment. After three steps at these conditions the adsorption zone moves to include the discrete non-separating section, and the flow rates mentioned above are returned to their standard values. Thus, the volumetric flow through the buffer zone of 121 liters (30.25 l/min*4 minutes) is 5 liters higher than the standard volume through the buffer zone for the same length of time of 116 liters (29 l/min*4 minutes). It is again noted that the manner in which these flow rates are controlled is not critical to the invention. For example, all three flow rates may be independently controlled, or the flow rate of one stream such as flow rate through the buffer zone may be changed by increasing the pump speed while the flow rates of the raffinate and desorbent streams are controlled in response to the increased buffer zone flow rate. In another example, the flow rate of a desorbent stream is decreased and the flow rate of the raffinate stream decreases in response to a process control loop such as one which regulates the system pressure. The pump speed may or may not be controlled independently.

In another embodiment, the standard conditions are the same as those given above. However, upon considering specifics of the particular separation and the equipment used, the increased volume will be distributed for 80 of the 240 seconds that the buffer zone includes the chamber crossover line, T=80 seconds. Thus, R is 3.75 l/min and the flow rate in the buffer zone is increased to 32.75 l/min while desorbent addition rate is changed to 12.15 l/min and the raffinate withdrawal rate is changed to 16.15 l/min. These adjusted flow rates may be applied for any 80 second time interval or combinations of intervals totaling 80 seconds within the time that the buffer zone includes the discrete non-separating section. It is preferred, but not required that the changes be applied for a single continuous interval of time. Again, the volumetric flow through the buffer zone 43.67 liters (32.75 l/min*80 seconds) is 5 liters higher than the standard volume through the buffer zone for the same length of time of 38.67 liters (29 l/min*80 seconds). In another embodiment, the changes are applied as soon as the buffer zone moves to include the chamber crossover line. That is, in this case the changes would be applied for one step per cycle, that step being the first one during which the buffer zone includes the chamber crossover line.

It is further noted that the flow rates need not be changed to their new value, held at the new value for the specified time, and then returned to their standard values as described above. That is, the invention also encompasses embodiments in which the flow rates vary in time. For example in the embodiment above where T=4 minutes and R=1.25 l/min the flow rates of the desorbent and raffinate streams may instead be decreased gradually from their standard values to new values that are 2.75 l/min less than their standard values, held at these new values for 48 seconds, and then increased in several incremental steps back to their standard values as long as there is a net increase in fluid flow through the buffer zone relative to the standard flow rate through the buffer zone. Specifically, 5 liters in this embodiment. Any pattern for changing the flow rates may be used and changes need not coincide with the step time of the process. There is no requirement for symmetry while increasing and decreasing the rates nor is there a requirement that a new flow rate be held constant for any period of time. Although generally less preferred, it is even possible to temporarily decrease the fluid flow in the zone such as by temporarily increasing the flow rates of the desorbent and raffinate streams in this embodiment above their standard values. Such variations of the flow rates over time encompassed by the subject invention are practically limitless.

In some embodiments, it is preferred that compensation for the discrete non-separating section be made every time the zone includes the discrete non-separating section, that is, once per cycle. However, in many embodiments, significant benefits may be obtained by less frequent adjustments to the various flow rates, such as being made in only one cycle out of three cycles or in only one out of ten cycles. Preferably, the compensating adjustments are made in at least once in every twenty cycles. There may be multiple compensating adjustments per cycle as adjustments may be likewise made for each zone as the zones move to include the discrete non-separating section during the cycle. In some such embodiments, one or more of the changed flow rates may not return to their standard values when a new zone moves to include the discrete non-separating section as they may be used according to the invention to compensate for the new location of the discrete non-separating section with respect to a portion of the circuit or zone. In another embodiment, the subject invention may be applied by changing the flow rates of the extract and raffinate streams during at least a portion of the time that the purification zone includes the discrete non-separating section to increase the volumetric flow therethrough. In this embodiment, the flow rate of the extract stream is decreased by the respective amount, R, and the flow rate of the raffinate stream is increased by the respective amount, R. This embodiment limits the increased fluid flow rate to the purification and adsorption zones of the circuit. A variation of this embodiment involves substituting a portion of the increase in the raffinate stream flow rate with a corresponding decrease in desorbent stream flow rate. In this variation, some of the increased flow rate is carried over into the buffer zone leaving only the flow rate in the desorption zone unchanged from its standard amount. This embodiment demonstrates that flow rate in different portions of the circuit may be increased by different amounts when the flow rates of more than two fluid streams communicating with the circuit are changed. Changing the flow rates of more than two fluid streams connected to the circuit also demonstrates that combinations of these changes may also vary significantly. For example, changing the extract and raffinate stream flow rates may be alternated with changing the extract, raffinate, and desorbent stream flow rates with every cycle. In another embodiment, the increased volumetric flow in a portion of the circuit during a single cycle may be accomplished by changing the extract and raffinate stream flow rates for an initial period, followed by changing the extract, desorbent, and raffinate stream flow rates for an intermediate period, followed by different values in the extract, desorbent, and raffinate stream flow rates during a final period of the cycle.

With respect to the input and output streams, it is preferred that some combination of changes to the flow rates of the desorbent, extract, and raffinate streams be used in the operation of this invention. However, the invention can also be practiced if the feed stream flow rate is changed. Furthermore, the use of many different optional input and/or output fluid streams is well known in the art of SMB adsorptive processes. Examples include: various "flush" and "recycle" streams, the addition of more than one desorbent stream, and the withdrawal of more than one extract stream among others. Thus, it is possible to practice the subject invention if the flow rate of one or more of these optional streams in a SMB process is used. There is no requirement that one or more of the desorbent, extract, and raffinate stream flow rates be changed. Through the use of such optional streams it is possible to limit the increased volumetric fluid flow to a fraction of a zone containing the discrete non-separating section or a portion of that zone and another zone or zones. Although preferred, it is not required that the flow rate through the discrete non-separating section itself be increased.

It is preferred but not required that the input and/or output fluid stream flow rates be changed between the time the zone shifts to gain and lose the discrete non-separating section, inclusive. For example, the flow rates of the desorbent and raffinate streams may be decreased prior to the buffer zone acquiring the discrete non-separating section and returned to their standard values after the adsorption zone acquires the discrete non-separating section. The invention also contemplates changing only one of the input or output streams. Such as decreasing the extract stream flow rate to increase the flow rate through at least a portion of the purification zone. Since changing the flow rate of only one input or output stream affects the mass balance of the circuit, such embodiments are considered more compatible with gas phase separations. However, temporary changes may be possible even in liquid phase processes—use of a surge volume in the circuit may facilitate such changes. Since such changes would eventually disrupt the process if used for sufficient time to remove or add mass to the circuit, they will usually be followed by a compensating adjustment in a later step that has the opposite impact on the mass balance of the circuit.

Thus, there are two requirements in a process according to the subject invention where at least one compensation for the volume of a discrete non-separating section is provided. First, the fluid flow rate in at least a first portion of the circuit is increased where a segment of the circuit or zone comprises the first portion of the circuit and a discrete non-separating section. Second, the flow rate of at least one of the fluid input and/or output streams is changed consistent with increasing the flow rate in the first portion of the circuit.

The invention is also applicable to SMB adsorptive separation processes that have more than one discrete non-separating section in the circuit. Again, it is of no consequence if these discrete non-separating sections are by design, such as for the additional volume to accommodate devices to distribute fluid to the highest adsorbent bed in a column or unintentional, such as those caused by adsorbent poisoning. In many commercial operating units the adsorbent is contained within two columns rather than one. Factors which influence the number of columns used include for example physical and economic constraints. The following discussion focuses on a SMB process with two columns having a first chamber crossover line connecting the bottom of the first column to the top of the second column and a second chamber crossover line connecting the bottom of the second column to the top of the first column thus completing the circuit. Each chamber crossover line defining a discrete non-separating section. The following presents a few illustrative embodiments of the invention applicable to such a commercial process having two discrete non-separating sections without limiting the scope of the claimed invention. The subject invention may be readily applied to SMB adsorptive separation processes having one, two, and more than two discrete non-separating sections.

In such a process, each zone will contain each discrete non-separating section once per cycle. It is possible that a zone may include multiple discrete non-separating sections for a period of time. In one embodiment, the flow rate in a portion of a first zone is increased and the flow rates of two optional fluid streams entering and/or leaving the circuit within the first zone are changed each time the first zone contains each of the discrete non-separating sections e.g., twice per cycle. Again, the frequency at which the compensating flow rates must be applied to affect a measurable economic benefit will vary with the specifics of the separation being performed. For example, it may be sufficient to apply the compensating factors only once per cycle. There is no requirement that the compensation be applied for the same discrete non-separating section each cycle. In other separation processes, it may be sufficient to obtain a benefit by applying the compensating adjustments, whether once or twice per cycle or some combination thereof, in only nine cycles out of ten cycles, and in other cases the adjustments may only be necessary in one cycle out of twenty. As before, the fluid stream flow rates may vary continually, incrementally, or in combinations thereof over time.

Also, as before, the compensating adjustments according to the invention may be applied to more than one zone per cycle. However, with more than one discrete non-separating section in the circuit, it is possible that two compensations to various flow rates according to the invention may be applied simultaneously or they may overlap for some period of time. In such cases, the compensating adjustments may be determined independently and then applied cumulatively as required. That is, in some embodiments the amount by which to increase the volumetric fluid flow, C, in each zone or segment of the circuit and the corresponding changes in the flow rates of the two or more fluid streams communicating with the circuit may be determined independently as previously described. The compensating adjustments may be applied simultaneously. Alternately, a first set of adjustments may be initiated and at a later time while the first set of adjustments is still in force, a second set of adjustments is initiated. There is no requirement as to which set of adjustments ceases first. Again the compensating adjustments are preferred but not required to be applied for a continuous period of time. In some processes, one or more zones may include two or more discrete non-separating sections at the same time. Therefore, multiple adjustments may also be performed for a single zone. Thus, the invention encompasses multiple compensations to the flow rates in portions of the circuit and a plurality of fluid streams communicating with the circuit. The compensations are cumulative for the period of time, if any that they coincide.

In one embodiment of the invention, the volumetric liquid flow through the desorption zone is increased and the flow rates of both the desorbent and extract streams are increased once per every other cycle that the desorption zone includes a first discrete non-separating section. In another embodiment, the liquid flow rate in the purification zone is increased each time per cycle that the purification zone includes a first discrete non-separating section by decreasing the flow rate of the extract stream and increasing the flow rate of the raffinate stream. This also increases the flow rate in the adsorption zone. In another embodiment, the liquid flow rate in the purification zone is increased twice per cycle, for a portion of the time the purification zone includes each of the two discrete non-separating sections by decreasing the flow rate of the extract and desorbent streams and increasing the flow rate of the raffinate stream. In a further specific embodiment, the increased volumetric flow through the purification zone to compensate for the presence of the non-separating section therein is accomplished when the adsorption zone includes a second non-separating section. In yet another embodiment, the liquid flow rate in each of the purification and buffer zones is increased each time per cycle that these zones include a discrete non-separating section. The increased flow rate in the purification zone is accompanied by decreasing the extract stream flow rate and increasing the raffinate stream flow rate. The increased flow rate in the buffer zone is accompanied by decreasing the raffinate and desorbent stream flow rates.

The use of a variety of other process streams in communication with the circuit such as multiple desorbent, extract, and flush streams are well known in the art of simulated moving bed adsorptive separation processes. These streams are some times considered to define additional zones or sub zones of the zones discussed herein. Although such streams may be required for one or more specific embodiments of SMB separation processes, they are considered "optional" for purposes of discussing the overall scope of the art. It is stressed that the subject invention encompasses the use of these streams. That is, the increased volumetric flow in a portion of the circuit may be affected by or simply accompanied by the appropriate, corresponding change in the flow rate of any of the fluid streams in communication with the circuit. The specific details of the desired separation are used to establish the many interrelated process variables such as the pressure, temperature, the types and number of adsorbents and desorbents used, ratios of feed to adsorbent and desorbent to feed, and the number of adsorbent beds and fluid flow rate required in each zone. The invention is not known to be limited to any specific SMB adsorptive separation process. For the purposes of the subject invention, the desired product may be obtained in either the extract or raffinate stream it is of no consequence if both or only one of the extract and raffinate components are the desired product.

Countercurrent SMB systems are described in many available references, such as U.S. Pat. No. 2,985,589, incorporated herein by reference in its entirety. Equipment utilizing these principles can vary in size from the pilot plant scale shown in U.S. Pat. No. 3,706,812 to commercial petrochemical plant scale, with flow rates ranging from a few cc per hour to many thousands of gallons per hour. Large scale plants normally employ rotary valves having a port for each transfer line while small scale and high pressure units tend to use valves having only two or three ports. The invention may also be employed in a SMB adsorptive separation process which simulates cocurrent movement of the adsorbent, like that disclosed in U.S. Pat. Nos. 4,402,832 and 4,478,721. The functions and properties of adsorbents and desorbents in the chromatographic separation of liquid components are well-known, and reference may be made to U.S. Pat. No. 4,642,397, which is incorporated herein, for additional description of these adsorption fundamentals. The process may also be used to separate mixtures of other fluids such as gases.

Existing SMB process units may be readily adapted to operate under the claimed invention. The practice of the subject invention requires no significant changes in adsorbent or desorbent composition or mechanical changes in the adsorption chamber. No new input streams are needed and the output streams are essentially unchanged except for the improved composition and changes in flow rates. The only significant change to the process equipment is that needed to vary the flow rates of the fluid streams to and from the adsorption chamber or circuit and to increase the fluid flow rate in the desired portion of the circuit. These changes are preferably made in and near the existing equipment that is currently used to control the flow of the flow rates. Some change in the fractionation equipment normally associated with an SMB process such as for concentrating the extract and raffinate components in the extract and raffinate streams and/or recycling of the desorbent may be required depending upon the specific changes in the extract and raffinate streams.

The practice of the subject invention is not believed to be related to or limited to the use of any particular adsorbent or adsorbent/desorbent combination. Examples of adsorbents which may be used in the process of this invention include: resins, carbon based materials, silicalite, non zeolitic molecular sieves, and zeolites, such as those classified as X and Y zeolites. The sorptive properties of one non zeolitic molecular sieve, ALPO-5, are described in the *Journal of Catalysis* 111, 23–40 (1988). Details on the composition and synthesis of many of these microporous molecular sieves are provided in U.S. Pat. No. 4,793,984, which is incorporated herein for this teaching. Information on adsorbents may also be obtained from U.S. Pat. Nos. 4,385,994; 4,605,492; 4,310,440; and, 4,440,871. Differing sieve/desorbent combinations are used for different separations. For instance, X zeolites, specifically X zeolites exchanged with barium or barium and potassium ions at their exchangeable sites, are preferred adsorbents for p-xylene recovery from xylene mixtures.

The wide variety of desorbents used in SMB adsorptive separation processes are selected based on the specifics of the separation desired. Common characteristics of desorbents are well known in the art. For example, desorbent should displace an extract component from the adsorbent with reasonable mass flow rates without itself being so strongly adsorbed as to unduly prevent an extract component from displacing the desorbent material in a following adsorption cycle. Naturally, desorbent materials must be compatible with the particular adsorbent and the particular feed mixture. They must not reduce or destroy the capacity of the adsorbent or selectivity of the adsorbent for an extract component with respect to a raffinate component. Nor should desorbent materials chemically react with or cause a chemical reaction of either an extract component or a raffinate component. The desorbent should also be easily separated from the extract and raffinate components, as by fractionation. Finally, desorbent materials should be readily available and reasonable in cost. Examples include: benzene, toluene, paradiethylbenzene, para-xylene, normal and branched paraffins and olefins, usually limited to a specific molecular weight, hexene, and water.

In order to verify the improvement expected from the invention, a comparison was performed using a computerized model which has been shown to accurately predict and correlate with the actual operation of commercial scale simulated moving bed adsorptive separation units used to recover para-xylene from a mixture of xylene isomers. The simulated unit had two chamber crossover lines, each having a volume equal to 1% of the total non-selective volume of the circuit. Twenty-four beds of adsorbent being divided equally between two columns with seven beds in the adsorption zone, nine beds in the purification zone, five beds in the desorption zone, and three beds in the buffer zone. The model produced the relative improvements shown in Table 1 when the volumetric flow in the respective zone was increased according to the invention as compared to simulations performed using the standard volumetric flows. For the simulations according to the invention, K=1.0, and a constant higher flow rate in the respective zone equal to the standard zone flow rate plus C/T was maintained for T=100% of the time the respective zone encompassed the discrete non-separating section. The flow rates of the two primary streams defining the boundaries of the respective zone were changed to limit the increased flow to only the respective zone of the circuit.

TABLE 1

| Zone | Benefits |
| --- | --- |
| Purification | Higher purity via a 45% decrease in extract stream contaminants |
| Desorption | Higher recovery via 20% less extract components in the raffinate stream |
| Buffer | 15% reduction in desorbent requirement |

What is claimed is:

1. A simulated moving bed adsorptive separation process comprising:
    circulating fluid through a circuit, said circuit comprising an adsorbent and a discrete non-separating section;
    passing a plurality of fluid streams into said circuit and withdrawing a plurality of fluid streams from said circuit;
    incrementing the location of said fluid streams along said circuit to simulate movement of said adsorbent;
    increasing the fluid flow rate in a first portion of said circuit to compensate for a volume of said discrete non-separating section; and
    changing the flow rate of at least one of said fluid streams consistent with increasing the fluid flow rate in said first portion of the circuit.

2. The process of claim 1 wherein said increase in fluid flow rate in the first portion of the circuit is defined as $$R=V*K/T$$

wherein R is the increase in fluid flow rate in said first portion of said circuit, V is the volume of said discrete non-separating section, T is the length of time the increase in flow rate is applied, and K is a coefficient between about 0.05 and about 3.0.

3. The process of claim 2 wherein T is greater than one half of one step, a step being the time between an increment of one of said fluid stream locations along said circuit.

4. The process of claim 1 further comprising reestablishing the flow rate of said fluid stream to be essentially equivalent to the flow rate of said fluid stream prior to the change.

5. The process of claim 1 wherein the first portion of said circuit comprises said discrete non-separating section.

6. The process of claim 1 further comprising maintaining the fluid flow rate in a second portion of said circuit simultaneous with increasing the fluid flow rate in said first portion of the circuit.

7. The process of claim 1 wherein the fluid flow rate in said first portion of the circuit is increased at least once in twenty consecutive cycles, a cycle being one complete traversal of said circuit by one of said fluid streams.

8. A simulated moving bed adsorptive separation process comprising:
    circulating fluid through a circuit, said circuit comprising an adsorbent and a discrete non-separating section;
    passing a plurality of fluid streams including at least a first and a second primary fluid stream into said circuit and withdrawing a plurality of fluid streams including at least a third and a fourth primary fluid stream from said circuit thereby defining four zones, a zone being a portion of said circuit between each pair of sequentially located primary fluid streams;
    periodically shifting the location of said four primary fluid streams along said circuit to simulate movement of said adsorbent, a step being the time between each such shift and a cycle being the completion of each available step in said circuit by one of said primary fluid streams;
    increasing the fluid flow rate in at least a portion of one of said zones, said zone comprising said discrete non-separating section; and
    changing the flow rates of at least two of said fluid streams consistent with increasing the fluid flow rate in at least a portion of one of said zones.

9. The process of claim 8 further characterized in that it is carried out in counter-current mode.

10. The process of claim 8 further characterized in that it is carried out in co-current mode.

11. The process of claim 8 wherein the first primary fluid stream comprises a feed mixture selected from the group consisting of paraffin isomers, olefins and paraffins, aromatics and paraffins, oxygenates, glucose and fructose, racemates, cymene isomers, cresol isomers, dimethyl naphthalene isomers, and $C_8$ aromatic hydrocarbons.

12. The process of claim 8 wherein the adsorbent is selected from the group consisting of silicalite, zeolites, non zeolitic molecular sieves, resins, and carbon.

13. A process for separating a feed mixture into at least an extract component and a raffinate component through use of an adsorbent having greater selectivity for said extract component as compared to said raffinate component, said process comprising:
    maintaining fluid flow within a circuit comprising a plurality of beds containing said adsorbent and at least one discrete non-separating section;
    passing input streams into said circuit, including at least a feed stream comprising said feed mixture and a desorbent stream, wherein the location of said feed stream defines a downstream boundary of a purification zone and an upstream boundary of an adsorption zone, and the location of said desorbent stream defines a downstream boundary of a buffer zone and an upstream boundary of a desorption zone;
    withdrawing output streams from said circuit including at least a raffinate stream comprising said raffinate component and an extract stream comprising said extract component, wherein the location of said raffinate stream defines a downstream boundary of said adsorption zone and an upstream boundary of said buffer zone, and the location of said extract stream defines a downstream boundary of said desorption zone and an upstream boundary of said purification zone;

periodically incrementing said feed, desorbent, raffinate, and extract stream locations along the circuit to simulate countercurrent movement of the adsorbent with respect to the fluid flow within said circuit wherein a step is defined as the time between each such incremental movement of said stream locations and a cycle is defined as the time required for said feed stream to complete each available step in said circuit; and changing the flow rates of at least two of the streams selected from the group consisting of input streams, output streams, and combinations thereof consistent with increasing the fluid flow rate through at least one of said zones comprising said discrete non-separating section, and increasing the fluid flow rate through at least one of said zones comprising said discrete non-separating section.

14. The process of claim 13 wherein said beds of adsorbent are contained within one column and said discrete non-separating section comprises a chamber crossover line that connects the terminal ends of said column to each other.

15. The process of claim 13 wherein said beds of adsorbent are contained in a plurality of N columns, and N crossover lines defining N discrete non-separating sections interconnect said columns such that a second terminal end of each column, except the last column, is connected to a first terminal end of the following column, and a second terminal end of the last column is connected to a first terminal end of the first column.

16. The process of claim 13 wherein the flow rates of said raffinate and desorbent streams are both decreased thereby increasing the fluid flow rate in said buffer zone where said buffer zone includes said discrete non-separating section.

17. The process of claim 13 wherein the flow rate of said extract stream is decreased and the flow rate of said raffinate stream is increased thereby increasing the fluid flow rate in said purification zone where said purification zone includes a first discrete non-separating section.

18. The process of claim 17 wherein a portion of said increased raffinate stream flow rate is replaced by a corresponding decrease in the flow rate of said desorbent stream.

19. The process of claim 18 further characterized in that said adsorption zone includes a second non-separating section when the purification zone flow rate is increased.

20. The process of claim 19 wherein the extract stream comprises para-xylene.

* * * * *